United States Patent
Kleinke et al.

(10) Patent No.: US 10,557,561 B2
(45) Date of Patent: Feb. 11, 2020

(54) PRESSURE-COMPENSATION DEVICE FOR A HOUSING

(71) Applicant: Carl Freudenberg KG, Weinheim (DE)

(72) Inventors: Christian Kleinke, Darmstadt (DE); Christopher Schaefer, Darmstadt (DE); Peter Kritzer, Forst (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 15/945,747

(22) Filed: Apr. 5, 2018

(65) Prior Publication Data

US 2018/0292020 A1    Oct. 11, 2018

(30) Foreign Application Priority Data

Apr. 6, 2017   (DE) .................. 10 2017 003 360

(51) Int. Cl.
*F16K 15/14*    (2006.01)
*F16K 31/126*   (2006.01)

(52) U.S. Cl.
CPC .................. *F16K 31/126* (2013.01)

(58) Field of Classification Search
CPC .................. F16K 31/126; F16K 15/148
See application file for complete search history.

(56) References Cited

U.S. PATENT DOCUMENTS

| | | | | |
|---|---|---|---|---|
| 2001/0029952 A1* | 10/2001 | Curran | ............... | A62B 18/10 128/206.17 |
| 2007/0222840 A1* | 9/2007 | Xiao | ............... | B41J 2/17513 347/86 |
| 2008/0155949 A1 | 7/2008 | Dunsch | | |
| 2009/0120949 A1* | 5/2009 | Mashiko | ............... | B01D 53/261 220/745 |
| 2009/0203275 A1 | 8/2009 | Dehn | | |
| 2009/0266815 A1 | 10/2009 | Lauk et al. | | |
| 2010/0187230 A1* | 7/2010 | Beer | ............... | B65D 77/225 220/89.1 |
| 2013/0032219 A1 | 2/2013 | Heim et al. | | |

FOREIGN PATENT DOCUMENTS

| | | |
|---|---|---|
| CN | 204610205 U | 9/2015 |
| DE | 102010044333 B3 | 12/2001 |
| DE | 102009050878 A1 | 4/2011 |
| DE | 102011015925 A1 | 10/2012 |
| DE | 102014010650 A1 | 8/2015 |
| EP | 1892029 A1 | 2/2008 |
| EP | 2503199 A1 | 9/2012 |
| EP | 2533346 A1 | 12/2012 |
| EP | 2554882 A1 | 2/2013 |
| JP | 2010504887 A | 2/2010 |
| JP | 2013155745 A | 8/2013 |
| JP | 2016131879 A | 7/2016 |

* cited by examiner

*Primary Examiner* — P. Macade Nichols
(74) *Attorney, Agent, or Firm* — Leydig, Voit & Mayer, Ltd.

(57) ABSTRACT

A pressure-compensation device for a housing includes: an inner side; an outer side; and a lattice-like cage having a gas opening. The gas opening connects the inner side and the outer side in a flow-conducting manner and is restricted, in a through-flow direction of the gas opening, by an inner edge and an outer edge. The gas opening is covered by a gas-permeable membrane. The membrane comprises a nonwoven-fabric composite part and has at least one nonwoven-fabric layer.

19 Claims, 1 Drawing Sheet

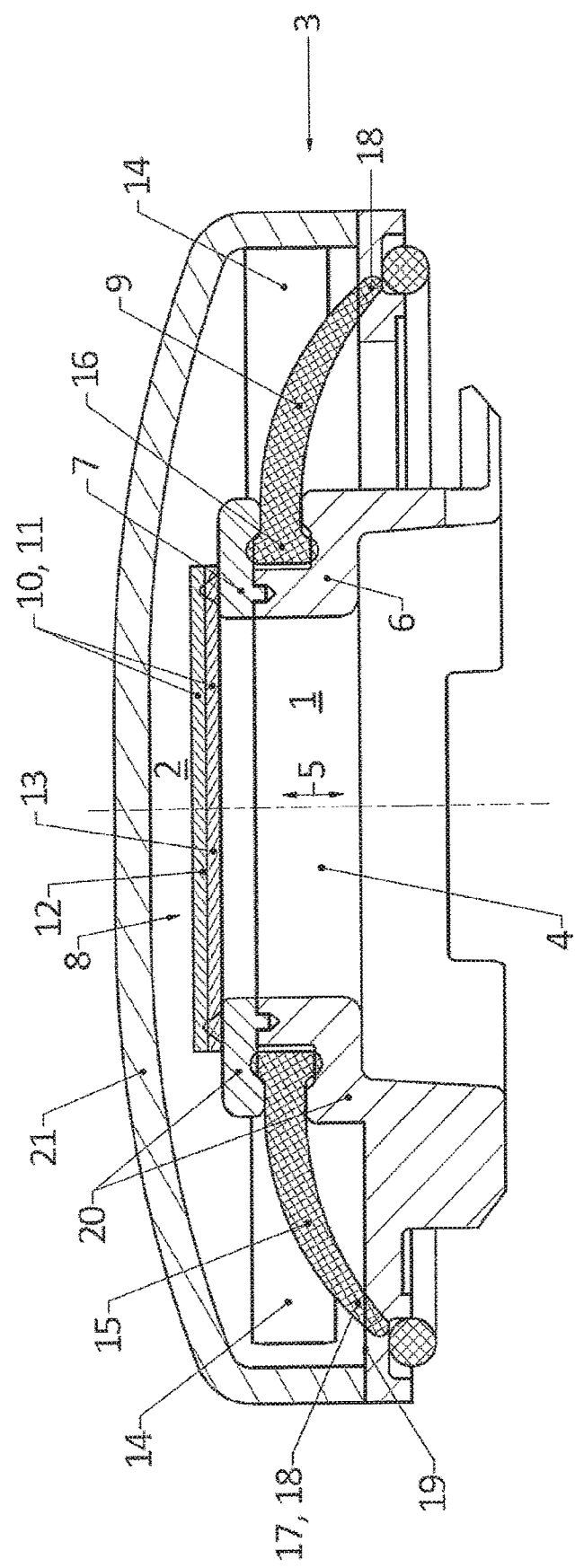

PRESSURE-COMPENSATION DEVICE FOR A HOUSING

CROSS-REFERENCE TO PRIOR APPLICATION

Priority is claimed to German Patent Application No. DE 10 2017 003 360.9, filed on Apr. 6, 2017, the entire disclosure of which is hereby incorporated by reference herein.

FIELD

The invention relates to a pressure-compensation device for a housing, wherein the pressure-compensation device comprises an inner side, an outer side and a lattice-like cage having a gas opening, wherein the gas opening connects the inner side and the outer side in a flow-conducting manner as required and is restricted, in the through-flow direction of said opening, by an inner edge and an outer edge, and wherein the gas opening is covered by a gas-permeable membrane.

BACKGROUND

Such a pressure-compensation device is known from EP 2 554 882 A1. The known pressure-compensation device is provided to compensate an internal pressure in a housing, an electrochemical device being arranged inside the housing. The gas-permeable membrane can deform according to changes in the internal pressure and preferably consists of a PTFE material. The membrane normally allows pressure compensation between the inner side and the outer side. In the event of an undesirably excessive internal pressure in the housing, the membrane is destroyed by a spike which is designed as an emergency degassing element. The destroyed membrane releases the gas opening for emergency degassing of the housing. This provides burst protection for the housing.

It is emphasized that it is essential for the known pressure-compensation device to be based on the concept according to which the functions of pressure compensation and emergency degassing are combined, while having a simultaneously high stability with respect to a water pressure from outside, in only one single component, namely the PTFE membrane which can be destroyed as required.

Using two different components, namely a first component for pressure compensation in the event of pressure fluctuations in normal operation, and a second component for emergency degassing as required, is explicitly considered to be disadvantageous.

SUMMARY

In an embodiment, the present invention provides a pressure-compensation device for a housing, the pressure-compensation device comprising: an inner side; an outer side; and a lattice-like cage having a gas opening, wherein the gas opening connects the inner side and the outer side in a flow-conducting manner and is restricted, in a through-flow direction of the gas opening, by an inner edge and an outer edge, wherein the gas opening is covered by a gas-permeable membrane, and wherein the membrane comprises a nonwoven-fabric composite part and has at least one nonwoven-fabric layer.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

The drawing is a schematic view of an embodiment of a pressure-compensation device. The pressure-compensation device can be used for all types of housings in which undesirable differential pressures between the inner side 1 and the outer side 2 are to be avoided.

DETAILED DESCRIPTION

To solve the problem, a pressure-compensation device for a housing is provided, wherein the pressure-compensation device comprises an inner side, an outer side and a lattice-like cage having a gas opening, wherein the gas opening connects the inner side and the outer side in a flow-conducting manner as required and is restricted, in the through-flow direction of said opening, by an inner edge and an outer edge, wherein the gas opening is covered by a gas-permeable membrane, and wherein the membrane is in the form of a nonwoven-fabric composite part and has at least one nonwoven-fabric layer.

It is essential to the invention that the membrane is in the form of a nonwoven-fabric composite part and has at least one nonwoven-fabric layer. The composite part is formed in at least two parts.

A nonwoven-fabric composite part has a much greater permeability than a watertight membrane which is in the form of a PTFE membrane.

The pressure-compensation device according to the invention is suitable in principle for all components having closed housings in which differential pressures between the inner side and the outer side can lead to damage or failure. At the same time, the membrane is intended to ensure that no water reaches the inner side from the outer side through the membrane.

Housings, in particular for electronic devices, such as batteries, inverters, electric motors or vehicle headlamps, generally have a dead volume enclosed in the housing.

For batteries in electric vehicles, this dead volume is typically more than 20 liters, which can constitute approximately 5% to 20% of the total battery volume. Depending on the design of the battery cells in the battery housing, this dead volume can even be substantially higher.

Similar situations arise in the case of electric motors. In this case, for technical reasons, dead volumes are present, for example in the region of the winding of the motor or as a result of the gap between the rotor and the stator. Any bearings provided also increase the dead volume.

Housings of electrical control units and sensor housings likewise enclose an unavoidable dead volume.

A similar situation also exists in vehicle headlamps.

In a hermetically sealed housing, as a result of heating/cooling during operation, external temperature fluctuations, for example due to climate, ascents and descents, atmospheric air-pressure fluctuations, transport processes, in particular during transport in aircraft, or going in or out of tunnels, both overpressures and negative pressures can occur inside a housing.

In recent years, housings have been constructed having increasingly thin walls, and thus are increasingly light, and therefore, as a result of the thin walls thereof, the housings have to be protected against undesirably high differential pressures. The pressure-compensation device is provided for this purpose. By means of the pressure-compensation element, pressure peaks can be reduced, and the potential pressure loads on the housing are thereby reduced in a defined manner.

Essential requirements for a well-functioning pressure-compensation device include good gas-permeability during normal operation, high gas-permeability from inside to outside during emergency degassing, high watertightness, good dirt resistance against oils and dust, and good mechanical robustness.

In particular, high gas-permeability in normal operation and high watertightness are conventionally difficult to combine. As already mentioned previously, a PTFE membrane is watertight; however, in normal operation of the pressure-compensation device, such a membrane is often not gas-permeable enough, and therefore such pressure-compensation elements would have to have a large cross section in order to function well, or a plurality of pressure-compensation elements would have to be connected in parallel.

By contrast, if the membrane consists exclusively of one nonwoven-fabric layer, said membrane can have a high specific permeability to air. However, due to the comparatively large pores, such a membrane is then not sufficiently watertight, and therefore liquid can undesirably penetrate from the outer side, through the membrane, to the inner side.

If a microporous PTFE film is used as a membrane, when said membrane has good watertightness, it has only a comparatively low air throughput. In particular in the case of emergency degassing, where large amounts of gas have to be discharged quickly, this leads to insurmountable problems. As a result, membranes of the type described at the outset are designed in such a way that they are destroyed when a critical pressure is exceeded, and only in that way can a rapid pressure compensation be achieved. However, this leads to the membrane subsequently being destroyed and having to be replaced. After the destruction of the membrane, the pressure-compensation device is no longer usable for the time being.

The nonwoven-fabric composite part has sufficiently high gas-permeability for the pressure-compensation device to function well.

According to one advantageous embodiment, at least one nonwoven fabric-layer can be in the form of a microfiber nonwoven-fabric layer. In this case, it is advantageous for a microfiber nonwoven-fabric layer to be advantageously designed to be water-repellent, and thus, despite the high permeability to air, for liquid to be successfully prevented from penetrating from the outer side to the inner side under normal operating conditions. This embodiment can be carried out for example by coating or impregnation or chemical grafting with fluorocarbons or polyurethane. In addition, a microfiber nonwoven-fabric layer which is finished in such a manner also protects against the penetration of oil and other dirt from outside. Furthermore, said layer protects the at least one layer of the membrane which is arranged thereunder against damage/destruction.

In addition, at least one nonwoven-fabric layer can be in the form of a superabsorbent nonwoven-fabric layer. A superabsorbent nonwoven-fabric layer of this type acts as a barrier layer and prevents liquid from penetrating from the outer side through the membrane to the inner side in every case. The superabsorbent particles contained in a nonwoven-fabric layer of this type absorb liquid from the outer side and retain it. The superabsorbent particles swell up when they come into contact with water, and therefore water from outside can no longer penetrate through the now closed surface. Superabsorbent particles are able to absorb and store many times their own weight in liquids.

The superabsorbent nonwoven-fabric layer can be arranged in the direction in which flow is possible on the side of the membrane which faces the inner side and, on the side thereof which faces the outer side, can be covered by the previously described microfiber nonwoven-fabric layer. This results in the nonwoven-fabric composite part.

Conventionally, the superabsorbent nonwoven-fabric layer, despite the watertightness thereof, is not sufficiently dimensionally stable on its own and therefore requires at least one support layer, which can be formed by the mentioned microfiber nonwoven-fabric layer or another porous material/structure.

In addition, the externally attached microfiber nonwoven-fabric layer protects the superabsorbent nonwoven-fabric layer. The superabsorbent nonwoven-fabric layer is thus activated only when liquid passes the outer microfiber nonwoven-fabric layer.

Drops from outside, for example condensate or dew, do not lead to the activation of the superabsorbent nonwoven-fabric layer. If the microfiber nonwoven-fabric layer withstands for example water pressures of a few centimeters, the superabsorbent nonwoven-fabric layer is activated only rarely.

The microfiber nonwoven-fabric layer accordingly forms a carrier layer for the superabsorbent nonwoven-fabric layer.

The superabsorbent nonwoven-fabric layer is designed to be self-sealing when it comes into contact with water and preferably watertight up to a water depth of at least 1 meter. Such watertightness is required in the protective class IP67 in order to protect sensitive components inside a housing against the admission of liquid.

The membrane can be integrally bonded to the outer edge of the gas opening. Preferably, the integral bond is formed by an ultrasonically welded connection. Such a connection is simple and reliable to produce and remains tight for a long operational life.

In a variation, the integral bond can be formed by an adhesive connection.

Depending on the circumstances of the respective application, when the pressure-compensation device must have not only good gas-permeability, but also burst protection, a pressure-relief valve can be used as burst protection, by means of which emergency degassing takes place on the inner side when an excess pressure considered to be critical is exceeded, before the membrane is damaged or destroyed. Even after emergency degassing of the inner side, the pressure-compensation device is thus available again without restrictions; there is no need to replace the membrane.

The inner side of the pressure-compensation device, and thus the interior of a housing which has such a pressure-compensation device, are thereby still protected against undesirable environmental influences.

The pressure-relief valve can comprise an annular screen which bulges convexly toward the outer side and is made of an elastomer material, the inner periphery of which screen substantially corresponds to the outer edge, wherein the inner periphery is in sealing contact with the membrane in the direction in which flow is possible on the side which faces the outer side. The elastomer material, of which the screen consists, is impermeable to gas and liquid. The inner periphery is supported in a sealing manner against the outer periphery of the membrane in order to prevent a flow bypass during the intended use of the pressure-compensation device in the contact region.

The screen comprises an outer periphery in the form of a sealing lip, wherein the sealing lip is in sealing contact with a sealing surface of the cage under resilient preloading, wherein the membrane and the screen together spatially separate the inner side and the outer side from one another, and wherein the sealing lip can be lifted off in an open position for emergency degassing of the inner side and to provide a flow-conducting connection between the inner side and the outer side.

The lattice-like cage can be formed in at least two parts, an outer half and an inner half, the membrane and the screen being arranged between the outer half and the inner half. The pressure from the inner side is applied to the lower face of the screen which faces the inner side, the pressure from the outer side, that is to say the ambient pressure, is applied to the upper face of the screen which faces the outer side. The lattice-like cage has lattice-like through-holes so that the inner pressure and the outer pressure can be applied to the membrane and the screen.

If the pressure on the inner side of the pressure-compensation device exceeds a predetermined threshold value, which is lower than the bursting pressure of the housing, the sealing lip of the screen lifts off the sealing surface of the cage for emergency degassing until the pressure falls below the critical threshold value once again. Afterwards, the sealing lip automatically lies against the sealing surface in a sealing manner again. The pressure-compensation device operates in a non-destructive manner. Following the emergency degassing, the pressure-compensation device, just as before the emergency degassing, can be used again without restrictions.

The cage preferably consists of a polymer material. In a variation, the cage can consist of a metal material.

The pressure-compensation device has an inner side 1 and an outer side 2, the pressure from the interior of a housing acting on the inner side 1, and the ambient pressure, in most cases atmospheric pressure, acting on the outer side 2.

The pressure-compensation device comprises a lattice-like cage 3 which, in the embodiment shown, consists of an inner half 20 and an outer half 21 of the cage 3. The gas-permeable membranes 8 and 10 of the screen 15 which is in the form of a pressure-relief valve 9 are arranged inside the cage 3, between the inner half 20 and the outer half 21. One part of the inner half 20 is the gas opening 4, which connects the inner side 1 and the outer side 2 in a flow-conducting manner as required. The gas opening 4 can be flowed through in direction 5 and is restricted by the inner edge 6 and the outer edge 7.

Throughout the entire operating life of the pressure-compensation device, the gas opening 4 is always covered by the membrane 8. The membrane 8 does not contribute anything to the burst protection for the housing.

By contrast, the pressure-relief valve 9 in the form of the screen 15 forms the burst protection. The membrane 8 and the pressure-relief valve 9 are arranged in a functional parallel connection in such a way that the pressure difference between the inner side 1 and the outer side 2 affects both the membrane 8 and the pressure-relief valve 9. Only when a differential-pressure threshold is exceeded, the pressure on the inner side 1 being greater than the pressure on the outer side 2, does the screen 15 release the direct path between the inner side 1 and the outer side 2 for emergency degassing of the inner side 1.

Burst protection for a housing, on which the pressure-compensation device is arranged, is thus provided.

In normal operation of the pressure-compensation device, the outer periphery 18, which is in the form of a sealing lip 17, lies in a sealing manner against the sealing surface 19 of the cage 3 under resilient preloading. A pressure compensation is carried out merely by the gas-permeable membrane 8, which is in the form of a nonwoven-fabric composite part 10 and consists of the microfiber nonwoven-fabric layer 12 and the superabsorbent nonwoven-fabric layer 13. The sealing lip 17 lifts off the sealing surface 19 only for emergency degassing of the inner side 1 and to provide a flow-conducting connection between the inner side 1 and the outer side 2. After the emergency degassing, the sealing lip 17 automatically lies against the sealing surface 19 in a sealing manner again.

In addition to the pressure-compensation function described previously having the greatest possible gas-permeability through the membrane 8, the gas-permeable membrane 8 and the pressure-relief valve 9 bring about a liquid barrier between the outer side 2 and the inner side 1.

For this purpose, it is necessary for the membrane 8 to be designed in a specific manner, namely as a nonwoven-fabric composite part 10.

In the embodiment shown here, the membrane 8, which is in the form of a nonwoven-fabric composite part 10 and is formed in two parts, comprises a microfiber nonwoven-fabric layer 12 and a superabsorbent nonwoven-fabric layer 13, the superabsorbent nonwoven-fabric layer 13 being arranged in the direction 5 in which flow is possible on the side of the membrane 8 which faces the inner side 1. On the side which faces the outer side 2, the superabsorbent nonwoven-fabric layer 13 is covered by the microfiber nonwoven-fabric layer 12.

If liquid is applied to the superabsorbent nonwoven-fabric layer 13, said layer absorbs the liquid into the structure thereof, which leads to swelling and to hermetic sealing of the gas opening 4. The gas opening 4 is thus accordingly watertight.

Once liquid is no longer applied to the membrane 8, and once the membrane 8 is dry again, the membrane 8 becomes gas-permeable again and thus releases the gas opening 4 through the membrane 8 again.

It should be noted that the case described above, in which the superabsorbent nonwoven-fabric layer 13 hermetically seals the gas opening 4, does not occur normally. The microfiber nonwoven-fabric layer 12 arranged toward the outer side 2 forms a protective layer for the superabsorbent nonwoven-fabric layer 13 and normally keeps liquid completely away from the superabsorbent nonwoven-fabric layer 13. The microfiber nonwoven-fabric layer 12 thus typically withstands water up to a depth of a few centimeters, and in particular sprays or splashes of water. The superabsorbent nonwoven-fabric layer 13 is exposed to liquid only in an emergency, for example if the housing which is provided with the pressure-compensation device is completely under water for a relatively long period of time, the water present being so deep that it can penetrate the microfiber nonwoven-fabric layer.

The through-holes in the upper half of the cage 3 are provided with the reference numeral 14.

In the embodiment shown here, the cage 3 consists of a polymer material, the membrane 8 being welded by means of ultrasound to the outer edge 7 of the gas opening 4. The upper half 21 covers the membrane 8 and thereby protects it against undesirable environmental influences.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A pressure-compensation device for a housing, the pressure-compensation device comprising:
    an inner side;
    an outer side; and
    a lattice-like cage having a gas opening,
    wherein the gas opening connects the inner side and the outer side in a flow-conducting manner and is restricted, in a through-flow direction of the gas opening, by an inner edge and an outer edge,
    wherein the gas opening is covered by a gas-permeable membrane, and
    wherein the membrane comprises a nonwoven-fabric composite part and has at least one nonwoven-fabric layer,
    the pressure-compensation device further comprising a pressure-relief valve assigned to the membrane in a functional parallel connection with the gas opening.

2. The pressure-compensation device according to claim 1, wherein the at least one nonwoven-fabric layer comprises a microfiber nonwoven-fabric layer.

3. The pressure-compensation device according to claim 2, wherein the at least one nonwoven-fabric layer comprises a superabsorbent nonwoven-fabric layer.

4. The pressure-compensation device according to claim 3, wherein, on a side of the membrane which faces the inner side, the superabsorbent nonwoven-fabric layer is arranged in the through-flow direction and, on a side thereof which faces the outer side, is covered by the microfiber nonwoven-fabric layer.

5. The pressure-compensation device according to claim 3, wherein the microfiber nonwoven-fabric layer forms a carrier layer for the superabsorbent nonwoven-fabric layer.

6. The pressure-compensation device according to claim 3, wherein the superabsorbent nonwoven-fabric layer is configured to be self-sealing when it comes into contact with water and is watertight up to a water depth of at least 1 m.

7. The pressure-compensation device according to claim 1, wherein the membrane is integrally bonded to the outer edge.

8. A housing, comprising the pressure-compensation device according to claim 1.

9. The housing according to claim 8, wherein the housing surrounds electronic components.

10. The housing according to claim 8, wherein the housing comprises a headlamp housing.

11. The housing according to claim 9, wherein the electronic components comprise electric motors or power electronics.

12. The housing according to claim 8, wherein the housing surrounds a chemical reactor.

13. A pressure-compensation device for a housing, the pressure-compensation device comprising:
    an inner side;
    an outer side; and
    a lattice-like cage having a gas opening,
    wherein the gas opening connects the inner side and the outer side in a flow-conducting manner and is restricted, in a through-flow direction of the gas opening, by an inner edge and an outer edge,
    wherein the gas opening is covered by a gas-permeable membrane,
    wherein the membrane comprises a nonwoven-fabric composite part and has at least one nonwoven-fabric layer,
    wherein the at least one nonwoven-fabric layer comprises a microfiber nonwoven-fabric layer, and
    wherein the at least one nonwoven-fabric layer comprises a superabsorbent nonwoven-fabric layer.

14. The pressure-compensation device according to claim 13, wherein, on a side of the membrane which faces the inner side, the superabsorbent nonwoven-fabric layer is arranged in the through-flow direction and, on a side thereof which faces the outer side, is covered by the microfiber nonwoven-fabric layer.

15. The pressure-compensation device according to claim 13, wherein the microfiber nonwoven-fabric layer forms a carrier layer for the superabsorbent nonwoven-fabric layer.

16. The pressure-compensation device according to claim 13, wherein the superabsorbent nonwoven-fabric layer is configured to be self-sealing when it comes into contact with water and is watertight up to a water depth of at least 1 m.

17. A pressure-compensation device for a housing, the pressure-compensation device comprising:
    an inner side;
    an outer side; and
    a lattice-like cage having a gas opening,
    wherein the gas opening connects the inner side and the outer side in a flow-conducting manner and is restricted, in a through-flow direction of the gas opening, by an inner edge and an outer edge,
    wherein the gas opening is covered by a gas-permeable membrane,
    wherein the membrane comprises a nonwoven-fabric composite part and has at least one nonwoven-fabric layer,
    the pressure-compensation device further comprising a pressure-relief valve assigned to the membrane in a functional parallel connection, the pressure-relief valve comprising an annular screen which bulges convexly toward the outer side and is comprised of an elastomer material, an inner periphery of which screen substantially corresponds to the outer edge, and the inner periphery being in sealing contact with the membrane in the through-flow direction on a side which faces the outer side.

18. The pressure-compensation device according to claim 17, wherein the screen comprises an outer periphery comprising a sealing lip,
    wherein the sealing lip is in sealing contact with a sealing surface of the cage under resilient preloading, wherein the membrane and the screen together spatially separate the inner side and the outer side from one another, and wherein the sealing lip is configured to be lifted off of the sealing surface and brought into an open position for emergency degassing of the inner side and to provide a flow-conducting connection between the inner side and the outer side.

19. A housing, comprising:

a pressure-compensation device, the pressure-compensation device comprising:
   an inner side;
   an outer side; and
   a lattice-like cage having a gas opening, wherein the gas opening connects the inner side and the outer side in a flow-conducting manner and is restricted, in a through-flow direction of the gas opening, by an inner edge and an outer edge, wherein the gas opening is covered by a gas-permeable membrane, wherein the membrane comprises a nonwoven-fabric composite part and has at least one nonwoven-fabric layer, and wherein the housing surrounds a chemical reactor.

* * * * *